UNITED STATES PATENT OFFICE 2,140,873

VAT DYESTUFFS

Ernst Honold, Frankfort-on-the-Main-Fechenheim, Germany, assignor to General Aniline Works, Inc., New York, N. Y., a corporation of Delaware No Drawing. Application August 5, 1936, Serial No. 94,339. In Germany August 10, 1935

1 Claim. (Cl. 260—274)

My invention relates to valuable new vat dyestuffs, more particularly to those of the general formula:

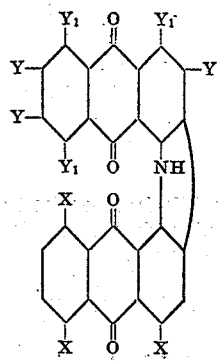

wherein one X means an acylamino group and the other X's mean hydrogen, and wherein one pair of adjoining carbon atoms marked Y and $Y_1$ is connected with a $Bz_1$-aminobenzanthronyl radicle the amino group of which is attached to a carbon atom marked $Y_1$, and the other carbon atoms marked Y and $Y_1$ are connected with hydrogen atoms. Particularly valuable are the dyestuffs of the following general formula:

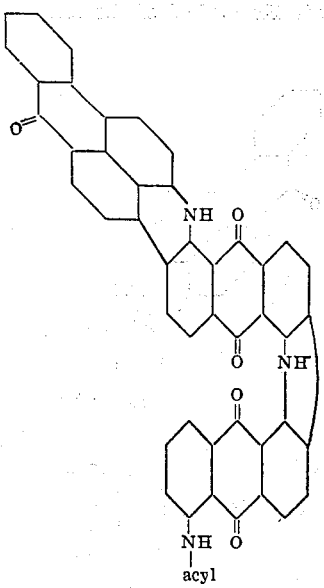

The new dyestuffs are manufactured for example by starting from diamino-diphthaloylcarbazols, condensing them with one molecular proportion of a $Bz_1$-halogeno-benzanthrone and treating the condensation product formed in either sequence with an alkaline condensing and an acylating agent.

Or a $Bz_1$-halogeno-benzanthrone is condensed with an acylamino-amino-diphthaloylcarbazol and the condensation product formed is subjected to the action of an alkaline condensing agent which is free from hydroxyl groups. When an alkaline condensing agent containing a hydroxyl group is used, then the acyl group is simultaneously split off and various acyl radicles may be subsequently introduced into the free amino group.

The new dyestuffs, which differ from those of the U. S. Patent No. 1,891,684, dye cotton very fast brownish to olive to greenish shades.

In order to further illustrate my invention the following examples are given, the parts being by weight and all temperatures in centigrade degrees; but it is, however, to be understood that my invention is not limited to the particular products nor reacting conditions mentioned therein.

Example 1

31 parts of $Bz_1$-bromobenzanthrone are condensed either with 56 parts of 5-amino-5'-benzoylamino-diphthaloylcarbazol or with 45 parts of 5.5'-diamino-diphthaloylcarbazol in which latter case the condensation product formed is subsequently benzoylated.

78 parts of the anthrimide thus obtained of the formula:

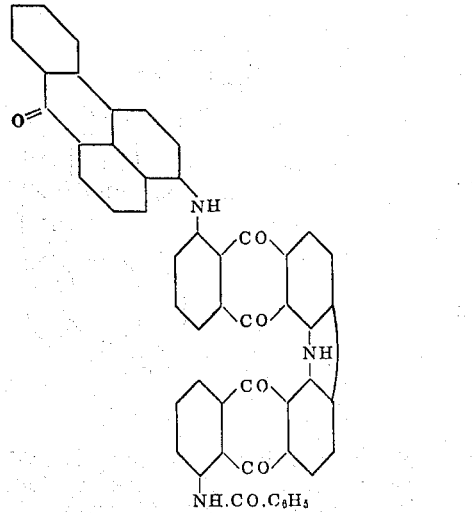

are added at about 140° to a solution of 250 parts of sodium aniline in about 800 parts of anhydrous aniline. Then nitrogen is passed through the mass the temperature of which is maintained at about 140°, until no unchanged starting material is present. When cool the reaction mass is poured into an excess of dilute hydrochloric acid and the precipitate formed is filtered off, washed and dried. The new dyestuff thus obtained of the formula:

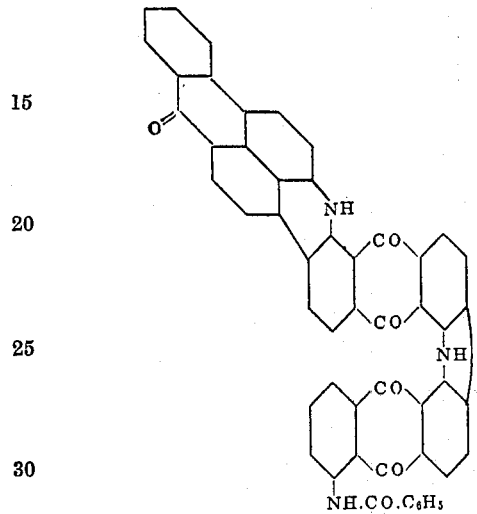

dissolves in concentrated sulfuric acid with a greenish blue color and dyes cotton from a brown vat very fast yellowish olive shades.

Example 2

45 parts of 5,5'-diamino-diphthaloylcarbazol are condensed with 31 parts of Bz₁-bromobenzanthrone and the condensation product formed is fused with alcoholic caustic potash. The product thus obtained of the formula:

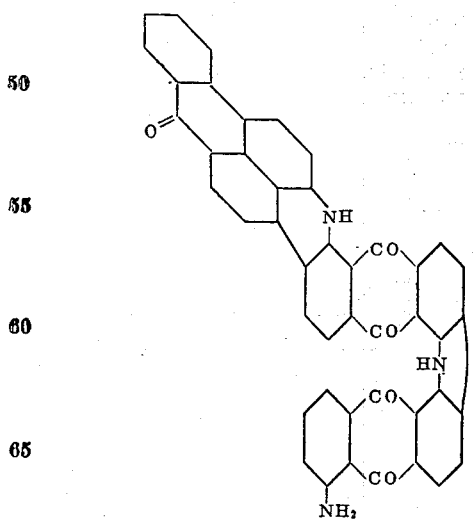

dissolves in concentrated sulfuric acid with an olive green color and dyes, when precipitated from this solution, cotton from a brown vat dark brown shades.

68 parts of this condensation product are finely divided and boiled for some hours with about 700 parts of o-dichlorobenzene and 70 parts of benzoylchloride in an apparatus provided with a reflux condenser. The dyestuff formed of the formula:

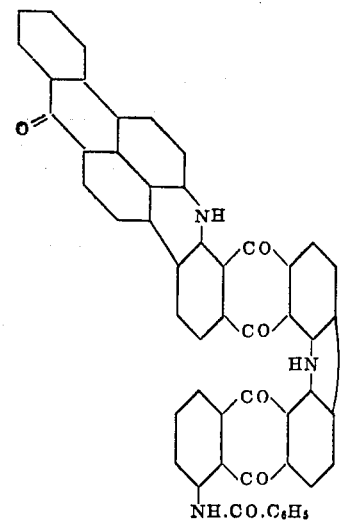

is filtered off while hot, washed and dried.

It is identical with the dyestuff obtained according to Example 1.

Very similar dyestuffs are obtained by employing a benzoylchloride substituted by halogen.

When the above dyestuff is dissolved in concentrated sulfuric acid and precipitated afterwards, it dyes cotton somewhat more greenish shades of likewise excellent fastness properties. A sulfo group seems to be introduced into the molecule of the dyestuff by treating with concentrated sulfuric acid.

Example 3

68 parts of the condensation product obtained according to Example 2 of the formula:

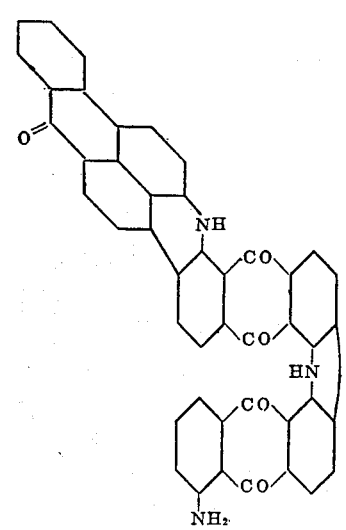

are finely divided and boiled for some hours with about 700 parts of acetic acid anhydride in an apparatus provided with a reflux condenser. The dyestuff formed of the formula:

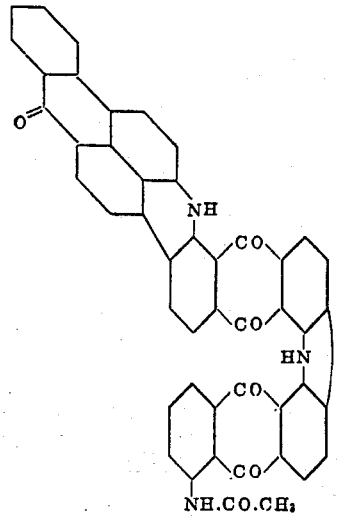

dyes cotton from a brown vat khaki shades of good fastness properties and dissolves in concentrated sulfuric acid with an olive green color. When it is precipitated from this solution, it dyes cotton more greenish shades of equal fastness properties.

*Example 4*

68 parts of the condensation product obtained according to Example 2 of the formula:

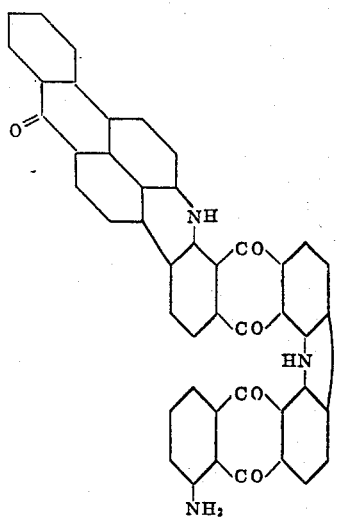

are finely divided and boiled for some hours with about 1000 parts of o-dichlorobenzene and 30 parts of anthraquinone-2-carboxylic acid chloride in an apparatus provided with a reflux condenser. The dyestuff formed of the formula:

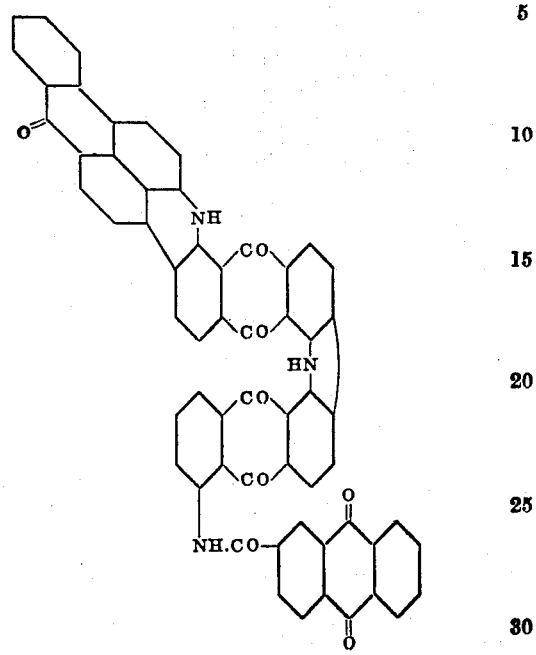

is filtered off while hot, washed and dried. It dissolves in concentrated sulfuric acid with a bluish green color and dyes cotton from a brown vat very fast khaki shades.

By employing instead of the anthraquinone-2-carboxylic acid chloride in the above example the corresponding amount (35 parts) of 1-nitro-anthraquinone-2-carboxylic acid chloride a dyestuff is obtained which dyes cotton from a brownish violet vat reddish brown shades of likewise very good fastness properties.

*Example 5*

56 parts of 4-benzoylamino-4'-amino-diphthaloylcarbazol are condensed with 31 parts of Bz₁-bromobenzanthrone and the condensation product formed is fused with alcoholic caustic potash. The product thus obtained of the formula:

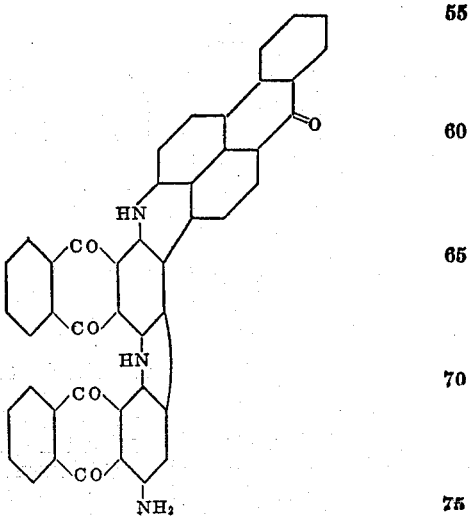

dyes cotton from a brown vat brown shades of insufficient fastness properties.

68 parts of this condensation product are treated according to the method described in Example 2 with 70 parts of benzoylchloride or the corresponding amount of benzoic anhydride in o-dichlorobenzene. The dyestuff thus obtained of the formula:

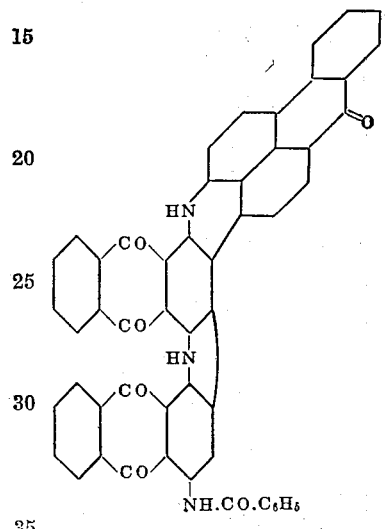

dissolves in concentrated sulfuric acid with a brownish violet color. When precipitated from this solution it dyes cotton from a brown vat brownish violet shades.

*Example 6*

45 parts of 4,5'-diamino-diphthaloylcarbazol are condensed with 31 parts of $Bz_1$-bromobenzanthrone and the condensation product formed is fused with alcoholic caustic potash. The product thus obtained of the formula:

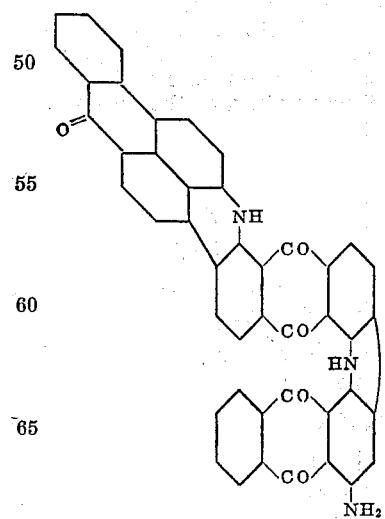

dissolves in concentrated sulfuric acid with a brownish black color and dyes cotton from the vat brown shades of insufficient fastness properties.

68 parts of this condensation product are benzoylated with 70 parts of benzoylchloride according to the method described in Example 2. The dyestuff thus obtained of the formula:

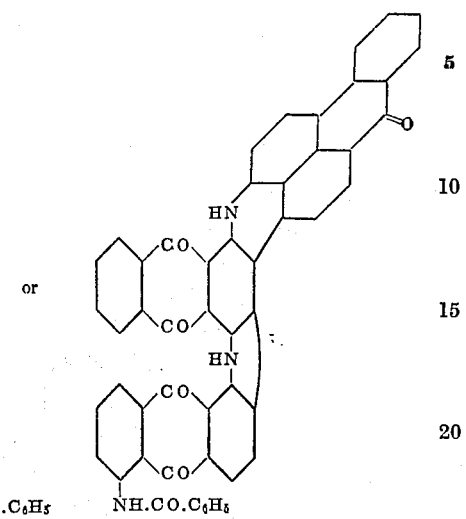

dissolves in concentrated sulfuric acid with a brownish black color and dyes cotton from a brown vat fast brown shades.

I claim:
A vat dyestuff of the formula:

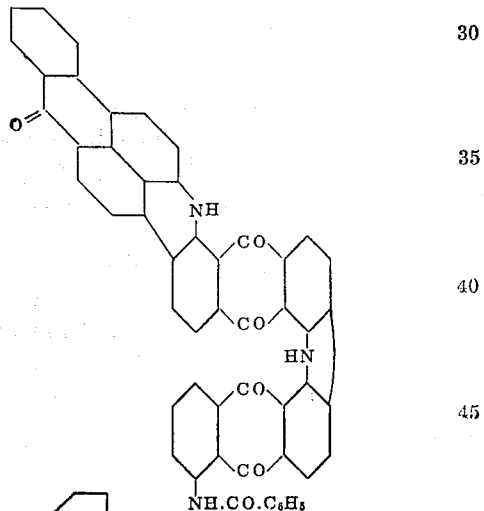

which dyestuff dissolves in concentrated sulfuric acid with a greenish blue color and dyes cotton from a brown vat very fast yellowish olive shades.

ERNST HONOLD.